(12) United States Patent
Young

(10) Patent No.: US 12,169,160 B2
(45) Date of Patent: Dec. 17, 2024

(54) SYSTEM AND METHOD FOR LINE PRESSURE TESTING WITH ISOLATION VALVE

(71) Applicant: Gregory E. Young, Prescott Valley, AZ (US)

(72) Inventor: Gregory E. Young, Prescott Valley, AZ (US)

(73) Assignee: VMI Manufacturing, LLC, Prescott Valley, AZ (US)

( * ) Notice: Subject to any disclaimer, the term of this patent is extended or adjusted under 35 U.S.C. 154(b) by 522 days.

(21) Appl. No.: 17/522,670

(22) Filed: Nov. 9, 2021

(65) Prior Publication Data
US 2022/0065732 A1    Mar. 3, 2022

Related U.S. Application Data

(60) Division of application No. 16/384,712, filed on Apr. 15, 2019, now Pat. No. 11,169,046, and a continuation-in-part of application No. PCT/US2017/056278, filed on Oct. 12, 2017.

(51) Int. Cl.
| | |
|---|---|
| G01M 3/28 | (2006.01) |
| B67D 7/32 | (2010.01) |
| E21B 47/117 | (2012.01) |
| F16K 15/06 | (2006.01) |
| F16K 17/30 | (2006.01) |
| F16K 37/00 | (2006.01) |
| G01M 3/00 | (2006.01) |

(Continued)

(52) U.S. Cl.
CPC ......... *G01M 3/2892* (2013.01); *B67D 7/3209* (2013.01); *E21B 47/117* (2020.05); *F16K 15/063* (2013.01); *F16K 17/30* (2013.01);
*F16K 37/005* (2013.01); *G01M 3/007* (2013.01); *G01M 3/04* (2013.01); *G01M 3/26* (2013.01); *G01M 3/2876* (2013.01); *Y10T 137/7727* (2015.04)

(58) Field of Classification Search
CPC ...... G01M 3/2892; G01M 3/007; G01M 3/04; G01M 3/26; G01M 3/2876; B67D 7/3209; B67D 7/085; B67D 7/36; E21B 47/117; F16K 15/063; F16K 17/30; F16K 37/005; Y10T 137/7727
USPC ..................................................... 73/40.5 R
See application file for complete search history.

(56) References Cited

U.S. PATENT DOCUMENTS

| | | | | |
|---|---|---|---|---|
| 3,940,020 A | * | 2/1976 | McCrory | B67D 7/3209 73/40.5 R |
| 4,410,109 A | | 10/1983 | Murrell, Jr. et al. | |
| 4,679,587 A | | 7/1987 | Jarr | |

(Continued)

*Primary Examiner* — Nathaniel T Woodward
(74) *Attorney, Agent, or Firm* — Bycer & Marion, PLC; Matthew L. Bycer

(57) ABSTRACT

A hydrocarbon dispensation line pressure sensor adapted to work without requirement of a separate closed valve. The system closes the dispensation line upstream via an isolation valve. The pressure can be sensed from the dispensation line through the valve to provide dispensation line pressure. A channel in fluid communication with the dispensation line may be provided to allow pressure measurement apart from the main dispensation line. Further, a method for measuring the pressure drop profile of a dispensation line and various methods to determine the pressure loss due to leaks in dispensation line.

20 Claims, 8 Drawing Sheets

(51) Int. Cl.
    *G01M 3/04*    (2006.01)
    *G01M 3/26*    (2006.01)

(56) References Cited

U.S. PATENT DOCUMENTS

| | | |
|---|---|---|
| 4,966,190 A | 10/1990 | Geisinger |
| 5,092,158 A * | 3/1992 | Tuma ................. F16K 37/0091 |
| | | 73/1.05 |
| 5,158,207 A | 10/1992 | Van Daele |
| 5,390,532 A | 2/1995 | Anthony |
| 5,664,601 A | 9/1997 | Chen |
| 6,269,678 B1 * | 8/2001 | Geisinger ........... G01M 3/2892 |
| | | 73/1.05 |
| 8,479,733 B2 | 7/2013 | Mashak |
| 8,794,595 B2 | 8/2014 | Reed et al. |
| 11,169,046 B2 | 11/2021 | Young |
| 2001/0054444 A1 | 12/2001 | Geisinger |
| 2004/0261503 A1 | 12/2004 | Hutchinson et al. |
| 2010/0238207 A1 * | 9/2010 | Shinkai ................ B41J 2/17566 |
| | | 347/85 |
| 2010/0281953 A1 | 11/2010 | Jarvie |
| 2010/0305883 A1 | 12/2010 | Danzy |
| 2018/0031143 A1 | 2/2018 | Cucciniello |

\* cited by examiner

SYSTEM AND METHOD FOR LINE PRESSURE TESTING WITH ISOLATION VALVE

CLAIM OF PRIORITY

The present divisional application includes subject matter disclosed in and claims priority to U.S. patent application Ser. No. 16/384,712, filed Apr. 15, 2019, entitled "Line Pressure Isolation Valve" (now U.S. Pat. No. 11,169,046), incorporated herein by reference, which is a continuation-in-part of PCT application entitled "Line Pressure Isolation Valve" filed Oct. 12, 2017 and assigned Serial No. PCT/US17/056278, and provisional application entitled "Line Pressure Isolation Valve" filed Oct. 13, 2016 and assigned Ser. No. 62/408,000, all herein incorporated by reference describing inventions made by the present inventor.

BACKGROUND OF THE INVENTION

1. Field of the Invention

The present invention is directed to fuel dispensation systems. The present invention is more particularly directed to leak detection and pressure detection in a fuel dispensation system.

2. Description of Prior Art

A typical vending station will include one or more dispensation lines that may be as long as many hundreds even a thousand or more feet of pipe with two to one hundred dispensers/nozzles. Typical lines are made of fiberglass and/or steel, and/or various types of flexible pipes made of different combinations of plastics and have various connectors which can add resiliency to the line. A "tight" site can include a 125-175 milliliter bleed back for line resilience. Flex connectors, steel tubes on the submersible, lines swelling with pressure, fuel dispenser connectors, etc., provide for unwanted resiliency. Up to 250 milliliters of resiliency is not uncommon when a system includes multiple flex connectors. Further resiliency above this level is typically caused by trapped vapor in a dispensation system with spacing and vacuums forming to provide low pressure to allow vapor to form.

In typical fuel vending stations, such as a gasoline and diesel vending station, underground storage tanks are used to store hydrocarbon fuels that can then be pumped through the dispensation system via dispensation lines to nozzles/dispensers into a vehicle onboard tank. Underground storage tanks typically have a submersible pump that is activated to provide pressurized force to draw liquid fuel from the underground storage tank into a pump head past a pump head check valve. Once fuel is in the head (and past the check valve), fuel may then pass into the dispensation lines. An emergency pressure relief top vent may be included in the head to prevent pressures exceeding a certain predetermined threshold, such as above 50 psi. Along the opening for fuel to enter the line, a line leak detector (LLD) may be included in some systems whereby fuel passes from the head, to the line leak detector, into the dispenser line (such as a two inch or lower line) and onto the nozzle.

In a typical gasoline station, submersible pumps in tanks are used in conjunction with an air eliminator valve that opens to reduce vapor in the pump head, allowing fluid and reduced vapor into the line for dispensation. When a nozzle is closed, the check valve in the dispensation line (such as the pump head check valve) will close to prevent fuel from returning from dispensation line back into the tank system. Furthermore, by preventing flowback through the dispensation line, substances such as fuel, recovered hydrocarbon vapor, etc. are prevented from entering the tank system. A column of fuel will remain in the dispensation line from the pump to the nozzle. Given that fuel is typically incompressible in its liquid form, the pressure in the dispensation line will prevent vaporization from occurring assuming no change to the environmental conditions. However, cooling or otherwise lowering the pressure along the dispensation line can cause the liquid to separate or components in the line to contract, thus lowering the pressure within the line, and allowing vapor to form. In a high resilient line (not preferred), components of the dispensation line can expand and contract to a greater degree, resulting in significant performance penalties. Thus, the dispensation line will preferably have low resiliency, meaning that the flexibility volume and size changes are minimized.

Line leak detectors such as the 99 LD-2000 leak detectors provided by Vaporless Manufacturing, Inc. of 8700 East Long Mesa Drive, Prescott Valley, Arizona 86314 solve this problem. Line leak detectors known in the art, such as the Check valve for a leak detector described in U.S. Pat. No. 4,966,190 to Geisinger, Penrod C., incorporated herein by reference, can also solve this problem. The mechanical line leak detectors known in the art provide a useful second leak detection point in the fuel dispensation system, enabling field technicians to adjust line leak detector to compensate for field variables and normal wear. For example, abnormal field conditions such as high line resiliency (high bleed-back), pump pressures over 30 psi and high head pressures affect line leak detection sensitivity. Additionally, normal wear and tear affects performance of leak detection over time.

High bleed-back may occur due to dips in the lines, stubbing for future dispensers, long pipe runs, and extremely flexible pipe. Bleed-back can be interpreted as energy coming back on the leak detector and trying to force the leak detector open. When a leak detector initially is installed and the line pressure is zero psi, the leak detector is in the "reset: position. When the pump starts, the leak detector allows approximately 1.5 gallons per minute to pass through. In this position, the line is being filled with product and the pressure in the line is slowly rising.

With the line filled with product and the pump still running, the line generally starts to expand as a balloon might. This expansion of the line often results in an applied force back onto the leak detector piston. Degrees and rates of expansion may vary depending upon several factors, including pressure and line material. For example, steel pipe typically expands less than fiberglass pipe and significantly less than flexible pipe. Air pockets in the line also contribute to bleed-back, which may be mitigated by attempting to eliminate those air pockets by purging the line.

There however exists the issue of being able to determine the pressure on the dispensation line in isolation of the system pressure which may be affected by pump head valves, or other items in the head, or tank system. Therefore, a system capable of holding pressure along a line independent of system pressure would be particularly advantageous.

It is therefore a primary object of the present invention to provide a means to hold pressure along the line, the means being independent of a pump check valve, the associated pressure relief, the pump head air eliminator, various gaskets and o-rings, and other parts of the pump.

It is a further object of the present invention to isolate downstream pressure from the pump to the head to the dispensation line.

It is another object of the present invention to prevent fluid downstream of a pump from draining back into the vessel from which it came.

It is yet a further object of the present invention to retain pressure in a line downstream of a pump and allow the pump head check valve to be free from unwanted pressures.

It is an as yet further object of the present invention to relieve the pressure in a dispensation line while preventing pressure against the pump at certain times such as during setup or manual inspection.

It is a further object of the present invention to provide a means to measure the volume of liquid line resiliency and bulk modulus of a dispensation line.

It is a further object of the present invention to reduce line detection false alarms.

It is another object of the present invention to increase the accuracy of line leak detection by decreasing the probability of small leaks signaling an alarm via a separate check valve independent of a pump check valve that can raise the inline pressure and reduce the effects of vapor entrapment.

It is another object of the present invention to provide a check valve to hold pressure independent of a submersible pump.

It is an object of the present invention to allow for isolation of the upstream pressures from the head, to check the pressure in the downstream dispensation line while maintaining pressure upstream of the head and/or head check valve.

These and other objects of the present invention will be made clear in light of the further discussion below.

SUMMARY OF THE INVENTION

The present invention is directed to a hydrocarbon fuel dispensation line pressure isolation valve. The valve may be attached to a line leak detector (LLD). The line leak detectors may be positioned in a fuel pump head, or if the pump head is not properly fitted, in an appropriate sealing downstream of a pump of an underground storage tank for fuel dispensation. In a preferred embodiment, the line leak detector includes a narrow longitudinal channel to provide access to line pressure through the narrow channel to be tested from a location outside of line without requirement of opening tank or tank cover to check pressure in line. The system may include an electronic pressure sensor or mechanical pressure switch coupled with the line leak detector preferably on the opposite side of the line leak detector from the dispensation line. The pressure sensor(s) may be coupled to an upper chamber of the system. The line leak detector preferably also includes shaft providing fluid communication with the dispensation line through the valve. A fastener or cap may be provided at a lower end of the LLD or hydrocarbon fuel dispensation line pressure isolation valve. The fastener preferably includes an aperture allowing fluid communication through the shaft to the pressure sensitive devices. In some embodiments, an upper chamber may be provided in the LLD in fluid communication with the dispensation line, and a diaphragm or other disc or piston may be provided that can communicate pressure to a pressure sensitive device. A pressure switch may be employed on the pressure sensitive device, or a membrane may be provided to measure the pressure.

The present invention further comprises the method of testing the pressure and determining the dispensation line pressure on a hydrocarbon discharge system. An initialization may occur where an amount of fluid is bled from the system to determine the volume of fluid required to be lost through the system to pass pressure from a first (high) threshold to a second (low) threshold. This may be between 22 psi and 14 psi, or otherwise as known in the art or further described below. Once the system is initialized, a pressure test will be run by sensing the pressure on a dispensation line upstream of a vending nozzle. The system will measure the time taken to drop pressure along a dispensation line between two predetermined thresholds. The measuring can be repeated, whereby the pressure is again brought up, as by an upstream supply pump, the pressure in the dispensation line is stabilized and then the system measures the time to drop between the two pressure thresholds. This can be repeated immediately, or over the course of a day, or otherwise, to better reflect the cause of the pressure drop, as between a leak in the dispensation line system, or other event. By initializing the line, the volume of loss can be determined. The pressure is preferably taken and measured via an isolation valve that closes off the dispensation line from the pump head or other upstream items, and the isolation valve preferably includes a channel in fluid, or other pressure, communication with the dispensation line to provide a reading of dispensation line pressure. The measurement can be taken at the far end of a line leak detector.

BRIEF DESCRIPTION OF THE DRAWINGS

The present invention will be described with greater specificity and clarity with reference to the following drawings, wherein like numerals designate like parts, and in which.

DETAILED DESCRIPTION OF THE PREFERRED EMBODIMENTS

Systems and methods consistent with the present disclosure provide line leak detection measurements based upon line pressure independent of pump on/off state and without removing check valves. The present invention is directed to a line pressure isolation valve. The present invention allows read of dispensation line pressure through an orifice or channel in the leak detector through a check valve via a tube and/or longitudinal hole that may be provided in a screw, or other fastener, or other portion of the bottom of the leak detector, to provide small access to the line pressure for reading pressure either mechanically or electronically. This will allow pressure to be monitored without the need to open the system to ambient pressure or air and allow identification of leaks in dispensation line with constant monitoring, rather than regular checking by opening head, etc. The isolation of the dispensation line pressure from the pump, e.g. downstream of the head, can significantly improve leak detection and response times, reducing maintenance costs and waste while extending system lifetime. This also allows check of pressure reading without disconnecting pressure seals.

Figure 1:
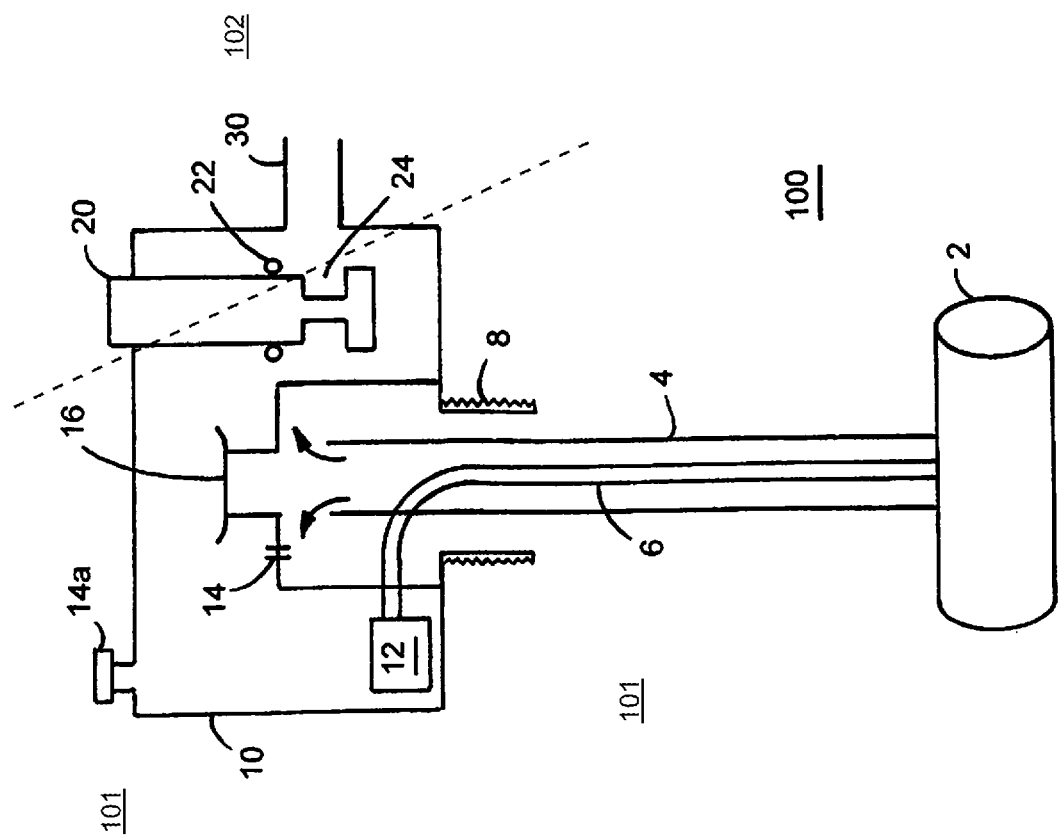
FIG. 1 demonstrates a model of a submersible pump and dispensation line of the prior art.

Referring to FIG. 1, a typical fuel dispensation system at a fuel vending station would include an underground storage tank, such as tank 100. Submersible pump 2 is present toward the lower end of tank, but not typically at the very bottom of tank, to avoid picking up phase separated water or other liquids at bottom of tank. Fuel in liquid form flows up pump line 4 into pump head 10. Upstream 101 includes items in the line upstream of the line detector 20, including the supply, pump and lines into the head and head check valve, while downstream refers to dispensation line 30 downstream of head and leak detector 20. Submersible pump 2 is powered by electrical line 6 that is supplied power through power supply 12. Power supply 12 may be a typical 220V alternating current voltage from the building or any other supply of power. A starter and capacitor will typically be used in this system. Pump head 10 includes pressure relief valve 14 as well as a check valve 16. Optional pressure relief may be provided at top or via pressure emergency relief 14a. The pressure relief is often set at around 20 psi within the head and prevents pressures from exceeding 50 psi. The check valve prevents flow back into the tank from the head or dispensation lines. Once fuel enters the head, fuel then passes through leak detector 20 through an opening for fuel to line 24 passing by a boss seal ring 22 into dispensation line 30. Typical dispensation lines known in the art are approximately two inches in diameter, but may be half an inch to one and a half inches to three inches as needed. Nozzles and dispensers not shown. The pump line 4 could also be a two inch pipe while the electrical conduit therein may be one half inch with wiring for electrical supply to submersible pump 2. Shaft 8 may be a four inch wide shaft which may be threadedly engaged into the top of the tank.

Line leak detectors (LLD), such as the improved leak detector of the present disclosure, replace the necessity of, or reinforce/provide redundancy to, the use of the pump head check valve, or may be used in conjunction with the check valve. The LLD may provide backup, and/or otherwise further support to prevent backflow into tank. Pumps typically produce upwards of thirty psi, and main check valves are often set around twenty psi. A leak detector in the prior art, and of the present invention, may open at about twenty psi of a thirty psi pump psi differential against back sealing pressure. Pressure is held on the dispensation line via the leak detector check valve, and the leak detector check valve typically responds by opening only to pump pressure within the head. The present invention provides for continuous line leak detection by keeping the dispensation line pressurized to avoid vapor pockets providing a differential pressure in the line system. Prior art mechanical leak detectors (MLD) respond to line pressure and pump pressure, staying open or (re)setting to be in the position to test the line when all pumps are turned off, and test for line leaks before fuel is dispensed. Electronic line test systems can test for leaks after each dispensation. Electronic line leak detection may be made via a permanent installment in the line. For regular (annual) testing, a test leak may be caused in the line. To access an opening in the line, typically one may use the bottom of a dispenser in the impact or safety valve separating the line from the dispenser, or may use a pre-installed Safety Port. Generators known in the art may be cycled, therefore tested on a monthly basis, whereas other systems, such as boiler tanks, may only be tested once or twice a year. Certain intermittent pressure sensing for line leak detection may take hours, sometimes many hours. The leak detectors of the present invention maintain fluid in the dispensation line and prevent vapor buildup in the dispensation line which may otherwise desensitize the line. Preferably, at least five psi is kept in line at all times, as five psi is known as a vapor pressure of hydrocarbons under certain conditions. However, in certain circumstances, the pressure on the line will necessarily need to be held above the vapor pressure to avoid "gassing out" of hydrocarbons, and therefore leading to false alarm leak detections. Reid vapor pressure may be set from one to two psi or, depending on time of year, vapor pressure may be set as high as fourteen psi or other pressures known in the art.

The typical pump head includes a bowl to receive incoming fuel from tank. The pump head may include a check valve that may open at a differential of very low one to two psi and a pressure relief over twenty to thirty psi to allow fuel to flow back into tank from dispenser. When check valves fail, the pump head check valve may be left open and head pressure from pump will reduce and cause flow back into tank. The check valve in the line detector provides a way of keeping pressure in the dispensation line and may also prevent hydraulic shocks along the line. Line detectors, as known in the art, may react poorly to shocks along the line as fuel is run down the dispensation line and reflects, or echoes, back through the dispensation line providing a pressure wave shock that may open the leak detector, specifically, separating the poppet/pin combination that is creating the restricted flow, as will be described further below. The One-Way Poppet Flow Path isolates pump turbulence from line leak detection at pump start-up. The hardened stainless steel poppet does not dimensionally change because of thermal conditions encountered during station operation (precision metering change is insignificant down to −20° F.). The reduced surface area of the piston significantly reduces the surface area exposed to hydraulic line shock.

The line leak check valve isolates hydraulic shock from the pump components. A primary concern of the present invention is to provide an isolation of the hydraulic shock from the delivery dispensation line pressure.

By isolating the dispensation line pressure from the pump head, leaks or failures of the dispensation line can be more easily identified and isolated from the leaks that might occur in the upstream pump components. This identification of dispensation line issues can be made without respect to leaks elsewhere upstream in the system, such as pump head check valve failures.

Figure 2:
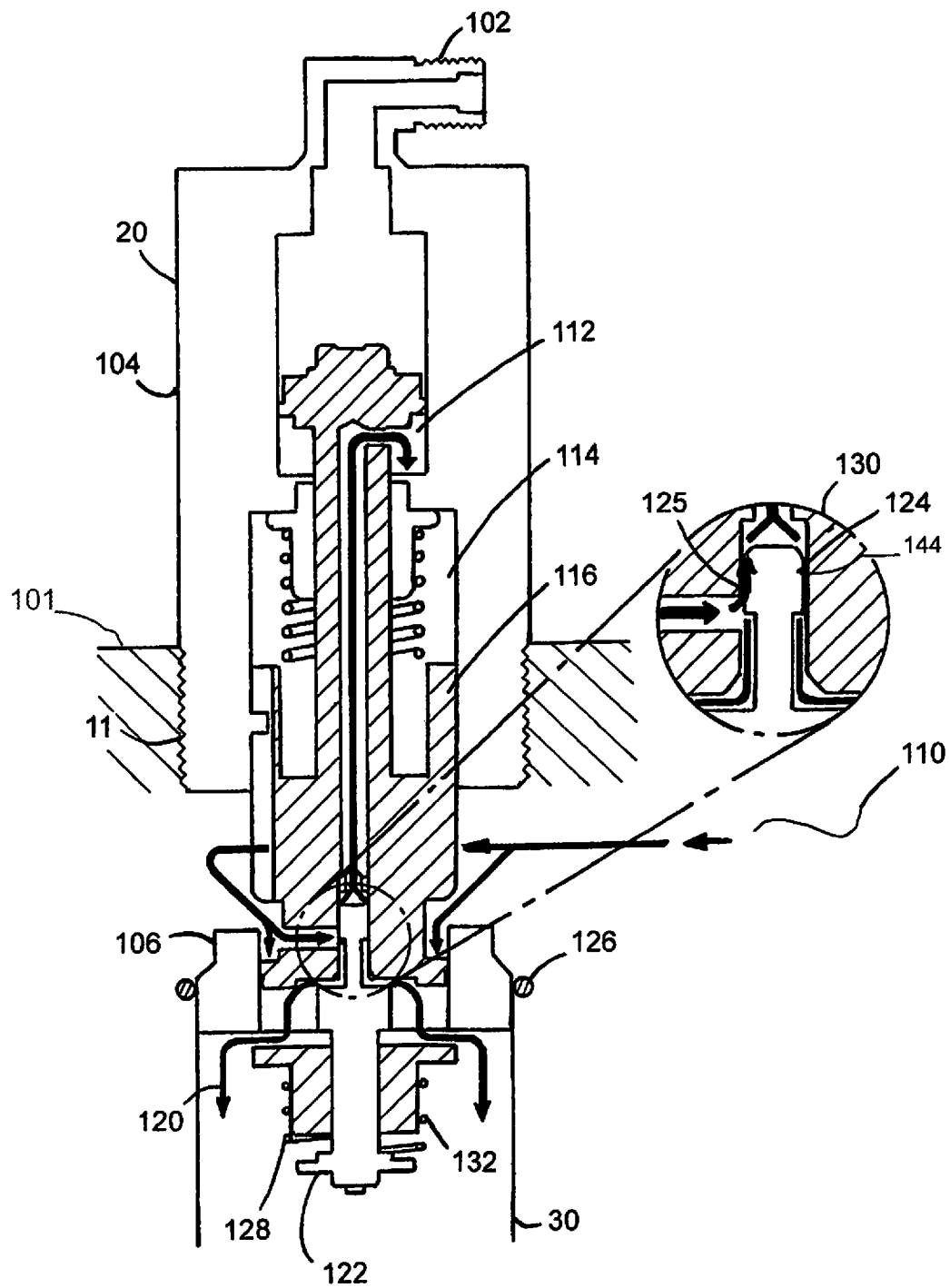
FIG. 2 demonstrates a cross-section of a leak detector of the prior art in a reset position.

Typical leak detection of the prior art, such as the Vaporless Manufacturing Inc. LD-2000 leak detector may be better understood referring to FIGS. 2-4. As seen in FIG. 2, an electric line leak detector is presented, here in reset position. An electronic switch indicating falling/fallen pressure is visible at the top of the MLLD in FIGS. 3 and 4. Leak detector 20 includes housing 104 that is connected to the submersible pump head 101 via threading 11. Pressure from a source pump (not shown in FIG. 2) via fuel is provided through the side along fuel flow line 110. The pressure from the source pump may be as high as fifty psi. As shown in FIG. 2, the leak detector is in a reset position. Basket 106 is provided with O-ring 126. When the pressure falls to approximately three psi and the pump has been turned on, the piston assembly is forced down, to where the poppet cross hole 125 is aligned halfway with the bottom of the head 144 of the metering pin 124 (as can be better seen in magnification box 130). Fuel passes by pin 124 downwards into outlet 120 to provide supply to dispensation line 30. Line leak check valve 122 is shown in a "closed" position and pressure relief 132 is shown. Pressure relief in valve, may be set at fifty psi to allow for thermal expansion and relief of pressure through valve. In the reset position, the leak detector allows approximately three gallons per minute to flow into the line.

Figure 3:
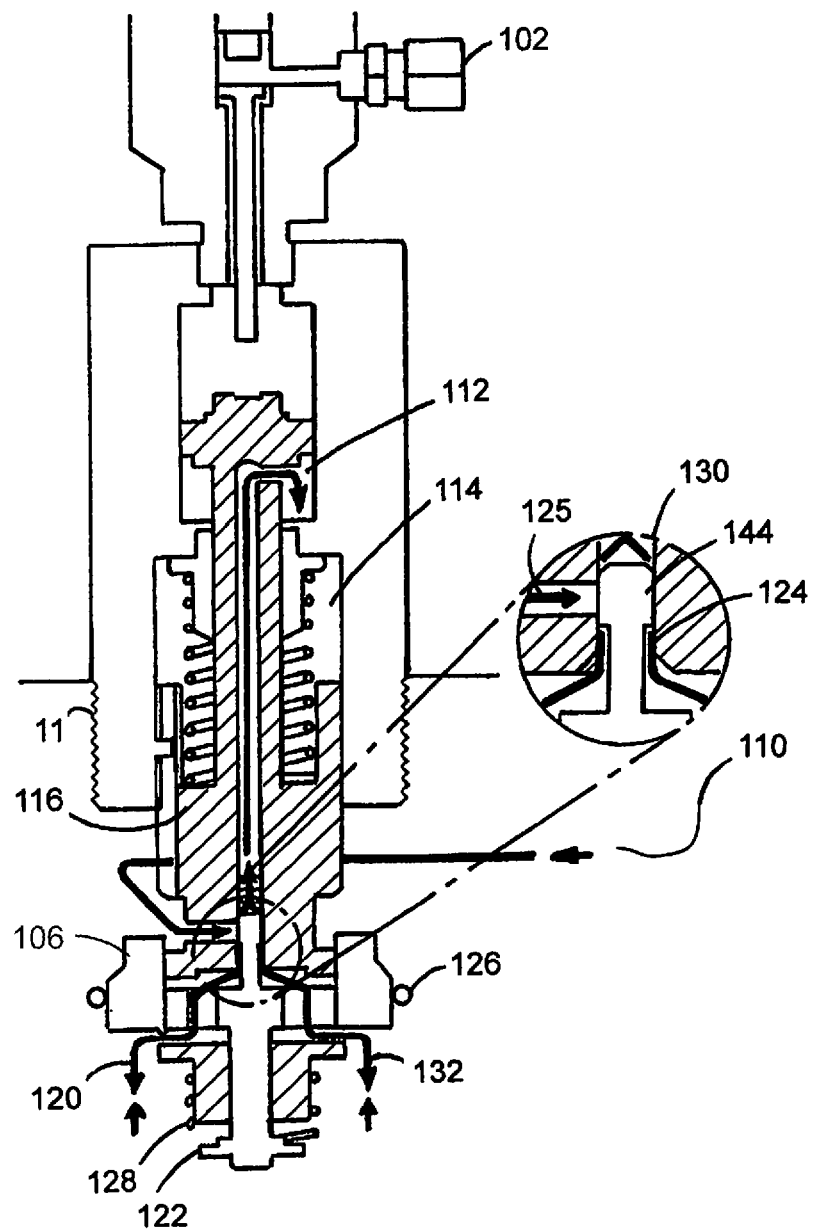
FIG. 3 demonstrates a cross-section of a leak detector of the prior art in a leak sense position.

As shown in FIG. 3, pressure causes poppet 116 as depicted in magnified view to move upward in cavity 114 from the pump pressure. The pin and poppet of the present invention are typically made from a hardened stainless steel to provide thermal density and reduce wear. Chamber and piston along line equalize the pressure in the system. Pin 124 may be affixed to the basket 304 (shown in FIGS. 1-3 as 106, in FIG. 6 as reference numeral 434.

In contrast, in the present invention, includes an improved LLD with cylinder piston screws into a housing to form an isolated chamber. A fluid communication path is provided so that pressure moves the piston up and down, relative to a pin. An alignment shaft moves up and down with pressure differential. A shaft may be affixed to the piston, but free float relative to the spring/guide. When pressure is lower than the threshold pressure (preferably at or above stability pressure) the device will work. Once the pump is shut off, pressure should stabilize in the dispensation line to a lower threshold, determined by the pump pressure, the pressure relief of the pump check valve and the pressure relief of the MLD check valve.

If pressure falls to a predetermined level, the sensor, part of 102 in FIG. 3, and part 405 in FIG. 6, and part 505 in FIG. 7 will not make contact with the piston/nut, this an indication of low line pressure (below predetermined level) readings can be communicated with a controller to restart pump to check consistency of dispensation line pressure loss (e.g. leak). For instance, if the system undergoes thermal pressure loss, refreshing the pump pressure into the dispensation line will be able to stabilize the pressure. Thermal effects can be determined and eliminated by the time variable. Thermal effect changes slow down as the temperature differential is mitigated with constant fuel repressurizations. Refresh rates for leaks are preferably set at consistent intervals. A different pressure drop profile can be determined based on time of the pressure drop. The invention may also be used to isolate and thereby maintain the pressure in the dispensation line, regardless of leak detection. The system may also be used to monitor the pressure in the dispensation line from intermittent use of liquid and gas dispensation. The system can also allow for auto-shutoff of pump for refill, while maintaining line pressure. The invention also isolates the dispensation line independent of upstream/head (valve) pressure, and can be used to maintain the priming of dispensation line. Features and embodiments of the present invention are described in further detail below.

As can be seen in FIG. 3, line leak detector 20 is in a leak sense position. When line pressure rises due to pump supply, the piston assembly moves up so that the poppet cross hole 125 is aligned directly with the pin 124 head 144. The leak detector allows approximately two gallons per hour to flow into a line at this leak sense position as system transitions to open for fuel supply. At this point, there is a risk of hydraulic shock against the check valve and poppet due to the slowdown of supply during leak sense position. By reducing the flow rate to two gallons per hour, the system can automatically sense a leak of two gallons per hour or more. If there is a leak in the line of two gallons per hour (GPH) or more, at this point, the pressure buildup in the line will cease. Fuel pressure is provided in the flooded bowl to bias and force poppet 116 upward. When there is a leak over two gallons per hour, the flow will not cause the poppet to move any further, and the leak detector will not open. In this way a failure to deliver fuel to the nozzle indicates a leak upon the line, and the leak detector prevents any further fuel flow into the leaking dispensation line. The leak detector typically takes approximately three seconds to move from reset to leak sense position to full flow position (as later described in with reference to FIG. 4).

Figure 4:
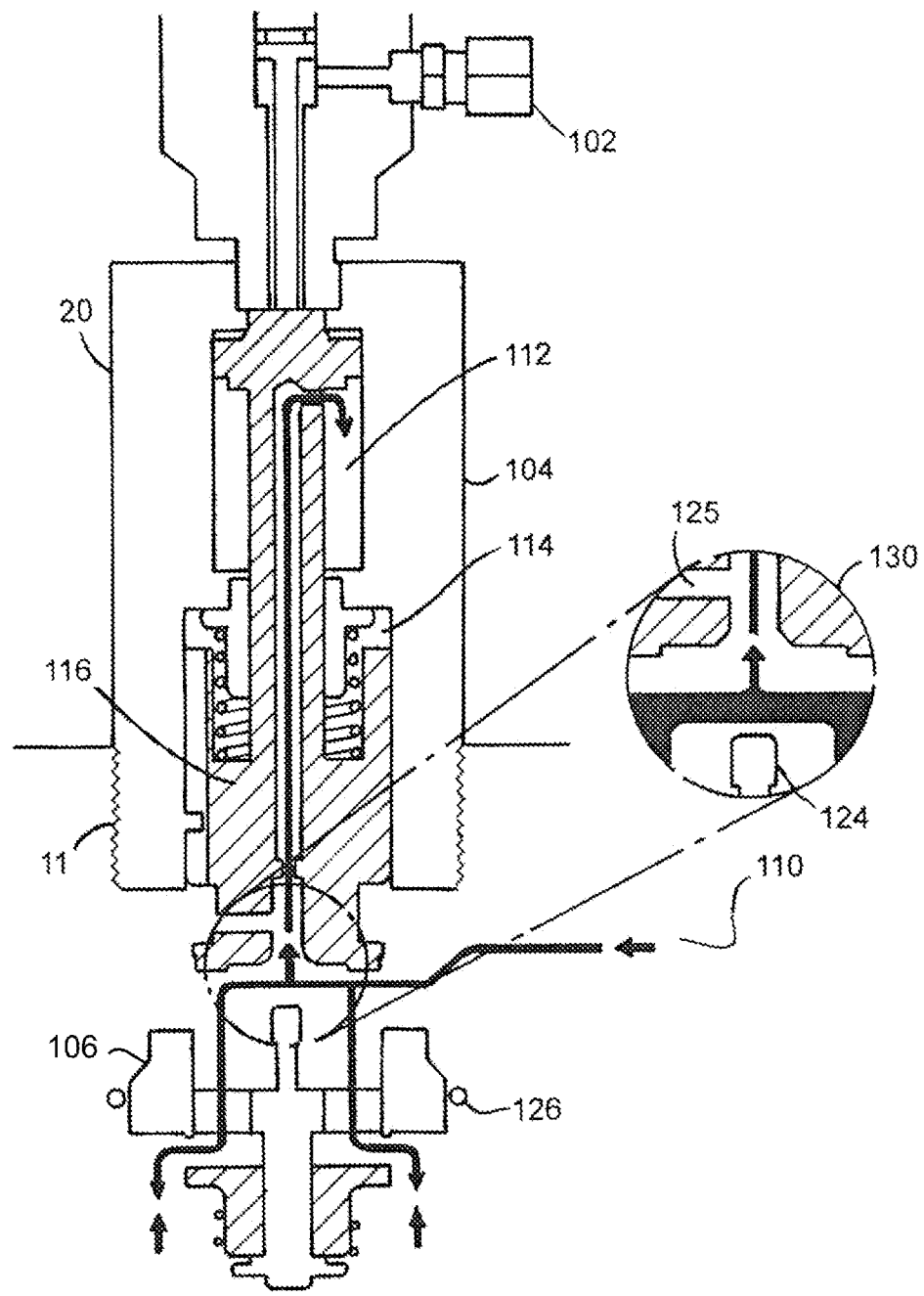
FIG. 4 represents a cross-section of a leak detector of the prior art in a full flow position.

As can be seen in FIG. 4, one embodiment of the present invention in a large leak detector 20 is in full flow position. When the leak detector passes the line, the piston assembly is forced to full open position allowing full pump pressure to flow through the leak detector into the line. Spring typically opens about 1½ pounds. The fuel flow through the basket as shown in cross-section 130 (FIG. 4) passes through "flow-through" holes. The entire housing of this model 104 will typically be approximately two inches in diameter.

With the line filled with product, the pump still running, the line starts to expand as a balloon might. The expansion of the line is creating energy that is being forced back onto the leak detector piston. Naturally, steel pipe has less expansion than fiberglass pipe, and much less expansion than flexible pipe. Air pockets in the line also raise the bleed-back level, so every effort should be made to eliminate those air pockets by keeping the fuel pressure high enough to prevent the formation of vapor pockets.

Further, when the pump is off, a leaking check valve in the turbine, defective submersible pump pressure relief, or a defective bypass valve will allow the line system to depressurize, resetting the leak detector. Drain back into the tank and thermal contraction will cause vapor pockets to form. Vapor pockets increase the length of time it takes for a leak detector to open to full flow. Low line pressure, resulting in vapor pockets, result in slow flow and technical support calls. Low line pressure, resulting in vapor pockets also result in missed line leak detections, both mechanical and electronic. The resulting service costs and customer dissatisfaction are not preferred.

In some situations, the leak detector may not stay at the leak sense position (such as a two to three GPH leak), but instead go through to full flow. If, when testing the leak detector, the pressure gauge shows a starting pressure of 0 psi and continues to pump operating pressure without hesitating at leak search pressure, the piston assembly may not have completely reset. A method for correcting this issue includes determining whether this has occurred two or more times in a row, turning the pump off, bleeding the line pressure to 0 psi, removing the vent line, and pushing the piston assembly down. The method may further include turning the pump on and re-testing the leak detector to assure it finds a leak.

Figure 5:
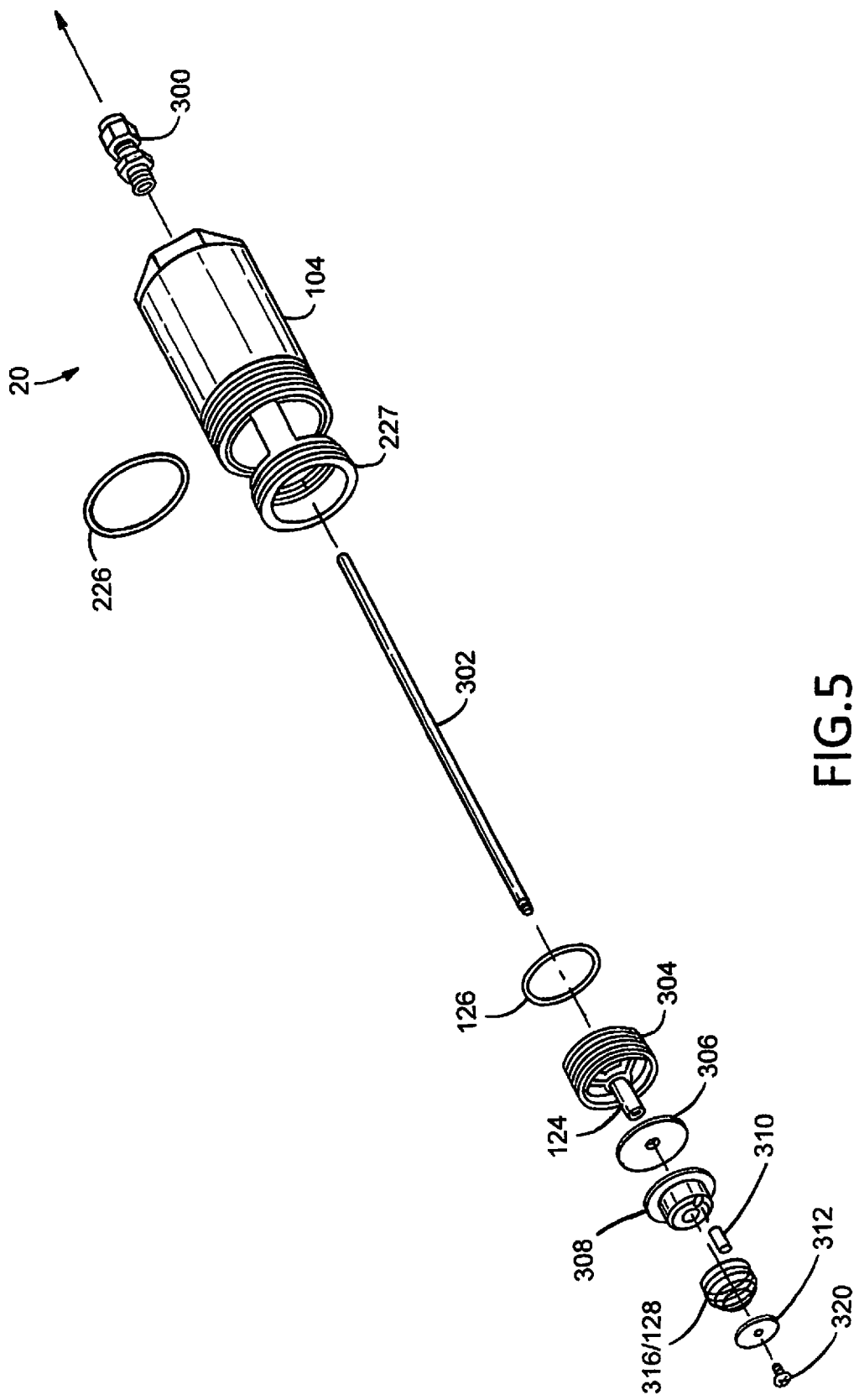
FIG. 5 demonstrates an exploded view of an embodiment of the present invention.

Referring now to a preferred embodiment of the present invention as shown in FIG. 5, leak detector 20 is shown in exploded form. Leak detector housing 104 is shown to incorporate the various components that are shown in exploded form. A lower boss O-ring 226 fits around the lower end 227 of housing 104. A basket O-ring 126 is provided to engage the basket 304. The check valve 308 fits downstream and outside the pump bowl, isolating the liquid in the line from the upstream plumbing and pump and provides for the flow as was shown prior. In this case, the shaft 302 screws into the basket 304. A check valve seal 306 provides a seal around basket 304 with opening. A check valve piston 308 provides for further function of the check valve. A relief valve 310 may be provided for pressure relief when a high end pressure, for instance coming from the thermal expansion of the downstream fuel on a dispensation line (not shown in FIG. 5) exceeds some threshold, such as twenty-nine psi coming back from the dispensation line over and above the pressure coming from the pump head. Check valve spring 316 is similar to spring 128 from prior FIGS. 2-3 to hold check valve 122 in place. A retainer 312 such as a washer, as is known in the art, is provided to hold spring 316 in place.

Components of the present invention further include a fastener 320, such as a specialized screw, bolt, nail, cap, plate, or other fastener as will be understood by those skilled in the art. In some embodiments, fastener 320 might be one useful in the arts, such as, for example in 8-32 by ⅜ inch screw. Fastener 320 may include a bore hole (shown more clearly in FIGS. 8A and 8B) to allow communication of the dispensation line pressure through and into a pressure pickup tube 302 that then communicates with a fitting 300 that can sense the pressure downline. The bore hole of fastener 320 may be formed via drilling, cutting, shaving, etc. In a preferred embodiment, the bore hole of fastener 320 is formed directly and longitudinally through a central axis of fastener 320, although embodiments wherein the bore hole through fastener 320 is not directly and/or longitudinally through the center of fastener 320 are fully considered herein. When leak detector 20 is assembled, pressure is otherwise sealed and when fuel is not flowing through the system, there remains communication through the bore hole in fastener 320 through pressure pickup tube 302 and to fitting 300 to test line pressure. Thus, the leak detector described herein advantageously provides capability of allowing flow from a pump into a delivery line, holding that flow and pressure in the line, having a pressure relief that protects the line and attachments such as a dispenser from excess pressure, and providing continuous access to the line for testing line pressure while, for example, a system pump is in an "off" state. Further, the leak detector is capable of testing line pressure in isolation from pump pressure issues, advantageously reducing false alarm rates. Fitting 300 may utilize fasteners known in the art, such as the threaded ¼ inch NPT threading. Fitting 300 may be configured to detect when sensed pressure exceeds or falls below a preset threshold, and may result in an alarm or other indication, as is known in the art.

The boss O-ring 226 tightens as the lower end 227 is pushed downward due to the threaded engagement of the housing and an appropriately designed receiver such as in a petroleum submersible pump head. This enables boss O-ring 226 to slip on and allow LLD 20 to be assembled with a smooth finish for a liquid tight seal. Interior sensor is preferably within the explosion proof housing 104 in direct communication with line pressure. Housing 104 preferably is UL (Underwriters Laboratories) explosion-proof rated. In preferred embodiments, electronics are disposed such that they are not in direct mechanical communication with the line pressure for any of the liquid fuel unless the components are designed to be in direct contact with hydrocarbons and any electronic components are isolated from the fuel and vapor or such that their operating parameters are rated to the environment and fuel, the electronic system rated for the fuel and vapor.

Figure 6:
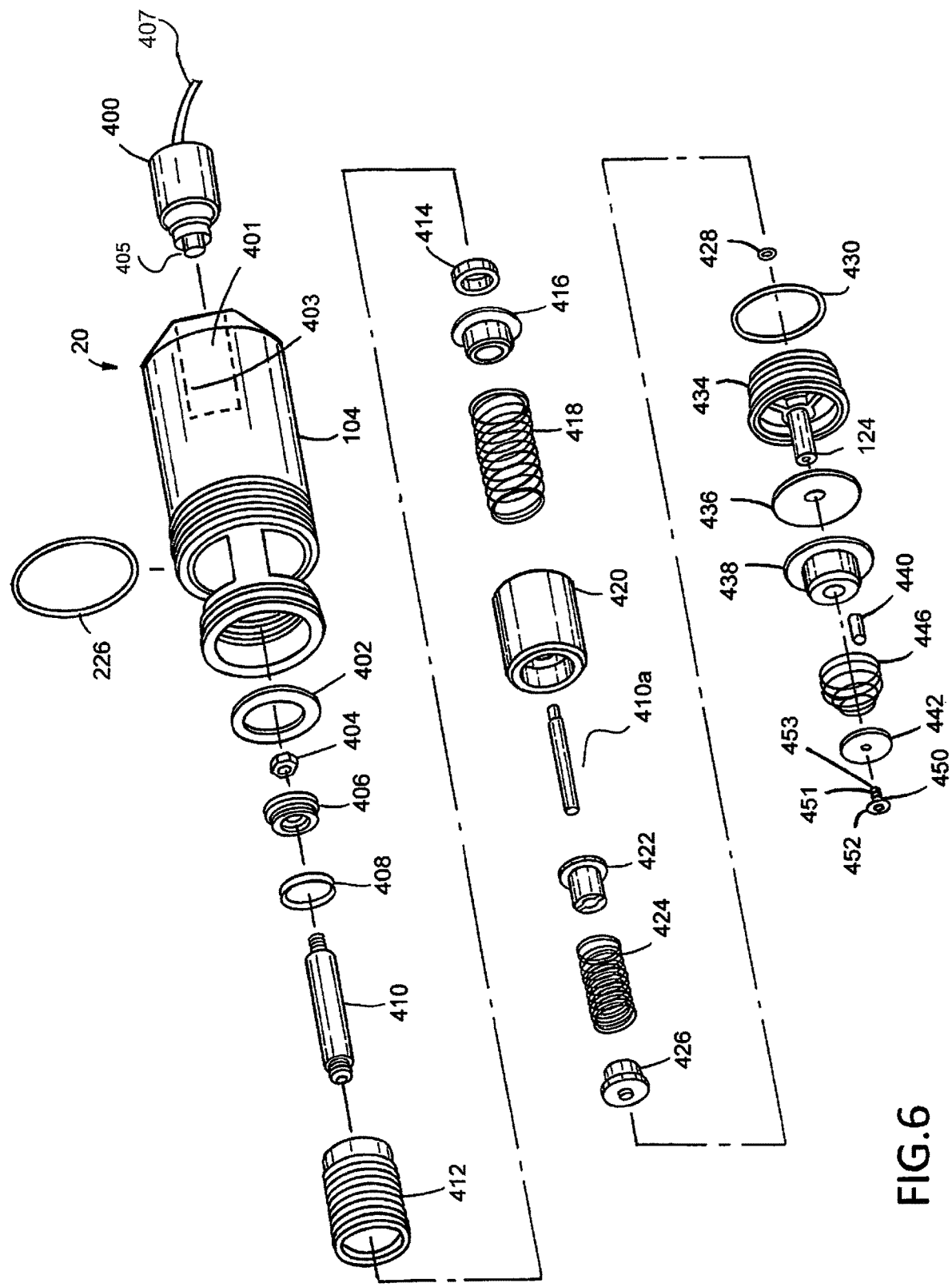
FIG. 6 demonstrates an exploded view of another embodiment of the present invention.

Whereas the prior embodiment shown in FIG. 5 can be used with various internal and external electronic pressure sensors, the embodiment shown in FIG. 6 is a mechanical pressure sensor. Depending on the type of electronic sensor integrated, the apparatus shown can provide single or multiple point pressure information or a range of pressure in the delivery pipe depending on the rate of the springs provided and the type of sensor attached. As with the leak detector shown in FIG. 5, housing 104 is provided to hold various components therein. Similar to the leak detector of FIG. 5, lower boss O-ring 226 fits around a lower end of housing 20. Cylindrical seal ring 402 provides a seal for top of cylinder 412 against the interior top of housing 104, flange nut 404 to fit against piston 406 and provide a piston seal 408. Shaft 410 provides for the fluid communication pressure from downstream fluid dispensation fluid line to pressure sensor 405 through the movement of the piston. A piston cylinder 412 provides for further housing of parts as described below. Seal shaft 414 isolates the interior of piston cylinder 412 from the pump pressure in the body cavity of housing 104 and is held in place fitting into upper spring guide 416 which provides for poppet return spring 418. Poppet return spring 418 biases pressure against centering connector 420. Centering connector 420 also provides threaded connection and fluid path with 410 and 410a. Spring guide 422, spring 424, and spring guide 426 with seal 428 insure the pressure connection to basket 434. This combination of springs and seal allowing the piston 406 to move in relation to line pressure through hollow stem 124 and hollow stem of the screw 452 or another appropriate fastener. Such fluid connection system also allowing the pump to deliver fluid to the line system and to hold such pressure in the line system independent of the pump head and upstream plumbing. Centering connector 420 provides for further guide to return spring 418. Alignment shaft 410A is in communication with shaft 410 to provide for pressure into upper piston chamber 112 of FIG. 2). Further spring 424 includes upper spring guide 422 and lower seal guide 426. The lower part of the mechanical line leak detector includes shaft seal 428 fitting within basket 434. Check valve seal 436 is provided along with a check valve piston 438 and optional pressure relief valve 440. A check valve spring 446 operates in the same manner and is held in place by spring retainer 442. Hole-bored fastener 450 is also provided. In this embodiment, fastener 450 is a specialized screw including a bore hole which screws into the hollow threaded shaft of basket 434 and provides pressure through fastener 450 into alignment shaft 410A which is then threadedly attached to centering connector 420 and shaft 410 also connected to centering connector and further attached into upper piston chamber 112. Pressure from dispensation line passes through fastener 450 and shafts 410A and 410 into upper piston chamber 112. While there maintains pressure in the dispensation line, flange nut 404 is biased against pressure sensor switch 405 in pressure sensor connector 400. While the pressure is up against the pressure switch, a signal is sent along signal line 407 indicating that the system is properly pressurized or a range of pressures sent along signal line 407 depending on sensor attached. When there is a pressure drop in the dispensation line, the pressure sensed in upper piston chamber 112, will fall, piston 406 and nut 404 will move downward, allowing pressure sensor switch 405 to move downward towards dispensation line and lose mechanical communication, often indicating a triggering event such as a leak in the dispensation line.

By utilizing a specially bored fastener in a leak detector system, the pressure of the dispensation line can be checked from the top of a leak detector and otherwise isolate the pressure from the dispensation line to the pump head and any other portion of the system. The system is capable of testing when the check valve is closed and there should be a static pressure in the system. The specialized bored fastener 450 preferably has a hole bored through it longitudinally from head 452 down threaded shaft 451 to bottom 453. The hole in the bored fastener 450 is configured to be in pressure communication with hollow stem 124 of the basket check valve 434, which is in pressure communication with alignment shaft 410a, which in turn is in pressure communication with shaft 410, which is in pressure communication with upper piston chamber 112, which is in pressure communication with upper chamber 401. In a preferred embodiment, the hole bored through fastener 450 is approximately (i.e., measured within a 5% error) ³⁄₃₂nds of an inch in diameter, though other dimensions are also fully considered herein (such as, for example, approximately ⅛ inch diameter). Other sized fasteners and channels are also contemplated, as may be useful for a variety of sized leak detectors and fuel system requirements, so long as they would be functional for the present purposes, such as to fasten, provide channel, etc. Thus, the present invention advantageously enables pressure communication through basket shafts, to seal. In this way, one can advantageously read the line pressure independent of check valves, or, as with the LLD of FIG. 5, when a system pump is in an "on" or "off" state. Preferred pressure in the line is preferably between five and fifty psi, with a minimum psi to prevent vapor gassing out of fuel. Reid vapor pressure to off gas vapor from liquid fuel will depend on fuel additives, fuel blend, and other conditions of the fuel, as will be understood by those skilled in the art. The present invention thus provides for enhancement to line leak detection via electronic detection (as shown in FIG. 5) or mechanical detection (as shown in FIG. 6).

Figure 7:
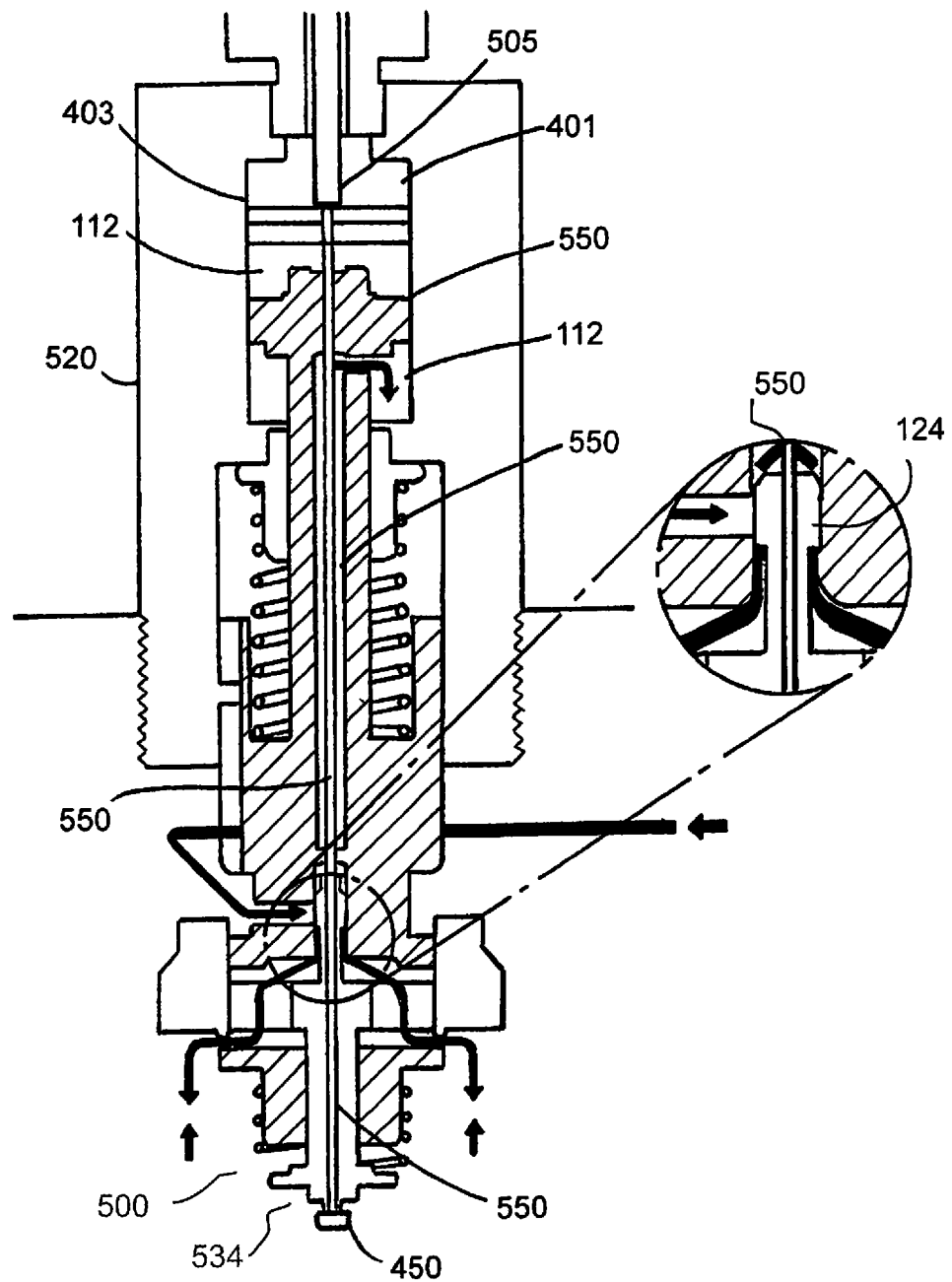
FIG. 7 demonstrates a cross-section of a further embodiment of the present invention in a leak sense position showing a hollow shaft providing a fluid path from the line to any of several pressure sensing devices.

FIG. 7 depicts a line pressure system in a leak sensing position consistent with at least one embodiment of the present disclosure. This system may be useful for both the mechanical function of a MLLD capable of providing mechanical three-gph line leak detection, and also having electronic line leak detection. Such a device provides the ability to provide line leak detection even at times the electronics is offline for any reason. The device is capable of providing a redundancy of checking the line in more than one manner to insure line leak detection in critical areas. As the pin/poppet combination (discussed above) is capable of different alignments, the flow between the pin and poppet may be of a different size different volume than three-gph. Such a device could be manufactured to provide a smaller or larger line check as needed, providing a primary line test function and a means to provide a secondary line check. Additionally, the functionality and accuracy of the electronic system can be compared to the mechanical line leak detection system providing a method to provide notice to check both systems if both are not reporting the same information, potentially preventing leaks to the environment.

Leak detector 520 includes channel 550 bored through the system, including hollowing the stem of the basket, 124 of 434 as shown in FIG. 6, passing through a hollow pin 124 and reaching an upper portion of the LLD. In the embodiment shown and described in FIG. 6, an upper chamber 401 may be provided. Upper chamber 401 is generally isolated from chamber 112 such that upper chamber 401 is not in pressure communication with chamber 112. Channel 550 should contain a hollow rod in communication with the bored channel of fastener 450, continuing through the hollow shaft that is threadedly connected to the poppet and piston assembly as seen in FIGS. 2, 3 and 4, hollow shaft connecting to a Tee where the hollow shaft is the only opening into piston chamber 112, said hollow shaft leaving the Tee continuing vertically to connect with a pressure transducer 505.

In a second configuration, Channel 550 must contain a hollow rod in communication with the bored channel of fastener 450, continuing through hollow shaft threadedly connected to the poppet and piston assembly as seem in FIGS. 2, 3 and 4, hollow shaft connecting to a 90 degree elbow, where the hollow shaft is the only opening into piston chamber 112.

Pressure may move a diaphragm or piston up to connect with pressure switch 505. This channel may provide for fuel to flow and be stored within the channel. Conversely, the channel may provide for pressure communication with a membrane. The pressure sensor may be at bottom, however, it is preferred that the sensor (or sensor switch) is further removed from fuel line for safety (and access) purposes. Alternatively, the channel may be filled with an incompressible substance and lightly connected (but not intermixed) with fuel. This may be a channel filled with water, mercury, etc. and substances known in the art to provide pressure transfer through a channel for sensing. It is preferred that the sensor be at the top of LLD 520. Electronics can be safely employed at the top of LLD 520, and may be housed in pump head 510, or outside of pump head 510, via access of protruding LLD 520.

Figure 8B:
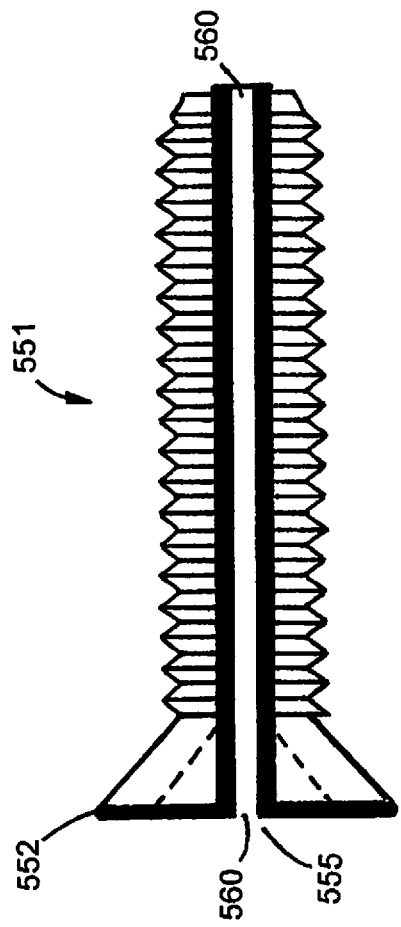
FIGS. 8A and 8B demonstrate a screw fastener of a preferred embodiment of the present invention top view and cross-sectional side view.
Figure 8A:
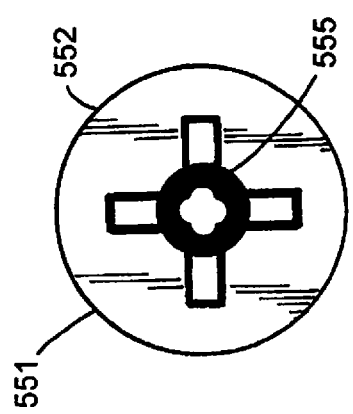

As can be seen in FIGS. 8A-8B, a preferred embodiment of a fastener comprising a hole bored screw 551 is shown. Screw 551 may be a standard Philips head, but can be any fastener known in the art to be amenable to inclusion in a check valve. This can include bolts, nails, caps, plates, etc. The screw head 552 includes hole 555 bored through. As can be seen in FIG. 8B, bore channel 560 is set longitudinally through screw 551 to allow fluid communication of downstream fuel in a dispensation line to share pressure information through screw 551, and therefore through a LLD to a pressure sensor (not shown in FIGS. 8A-8B). Channel 560 mates with channel 550 to provide access to pressure sensing above LLD 520.

The present invention also includes a method to control pressuring system in housing in directed fluid connection with the line. If risk of ignition is relatively high (e.g., in a high-voltage system, such as, for example, a 220V system), the housing will preferably be explosion proof. However, if the voltage is maintained at a low enough magnitude so as not to result in significant heat buildup, spark risk or otherwise cause a risk of igniting the fuel, the housing may not necessarily need to be explosion proof. The risk of fuel ignition as correlated with voltage will be known to those skilled in the art. In a preferred embodiment, the sensor will be screwed to the top of the housing, although additional embodiments where the sensor is disposed within the housing at a relatively low voltage (e.g., <10V) are considered herein. In some instances, a first fixture will be placed on top of the leak detector leading to an electronic pressure sensor that is either in fluid communication or otherwise leading pressure at the line leak detector top fitting. It may be possible to have a wireless remote sense line pressure. For instance, a fitting may include an antenna that may receive and/or provide a RF or Wi-Fi signal.

In another embodiment, a pressure transducer within the housing can sense a mechanical switch when a pressure differential with a magnitude greater than a preset threshold is present and thereby send a signal to a central processing unit. Systems may additionally include standard computer components such as memory, a power supply, communication circuitry, etc. A digital signal can be sent therefrom, wirelessly or wired to a central processing system. Signals can be sent on a regular basis or a continual basis, such as every second, every 30 seconds, etc.

In order to set up the system, typically the dispensation line is flushed to provide a solid liquid fill of dispensation line. Two pressure points are indicated and stored in system memory to understand how long a pressure drop in the line takes between the two pressure points. For instance, when pressure drops in the line from twenty to fifteen psi due to an induced leak of, as example, three gallon per hour (gph) the line system will give a specific time for the pressure drop. That time will consistently repeat, in the same time between those two points (unless thermal contraction or thermal expansion of the fuel occurs). Thermal contraction will cause a pressure drop or accelerate a pressure drop on a line with a leak, thermal expansion can prevent the detection of a leak or offset some of its affects. Multiple tests can be conducted to determine whether the pressure drop time is faster, slower, consistently the same (leak), or no change (tight line). As time passes, the fuel reaches equilibrium with the surrounding environment and thermal changes slow, allowing accurate detection of a leaking or tight line. In this manner the testing can occur until the thermal effects subside. Consistent readings allow detection of the line condition, as being tight or leaking.

The present invention includes a method for calculating a leak rate. The volume of fluid loss can be determined between two (pressure) set points. This can be found by timing the amount of time it takes to move between two set points under a constant temperature, pressure, and other ambient conditions. This may be determined manually by bleeding the dispensation line to determine the volume necessary to drop pressure in dispensation line between two set points. The amount of time it takes to drop down to the second set point of pressure along with the volume collected between those points will help in determining the gallon per hour leak rate. Accounting for variables such as temperature, thermal expansion, coefficients of expansion, time, barometric pressures, etc., one can see whether or not the drop between the two set points indicates a leak or other issue with the line.

Typical thermal contraction will cause dispensation line to drop in pressure, often to as low as around 0 to 3 psi. Prior art testing of dispensation line (electronically) typically occurred whenever an authorization ends. Tests were approximately at three gallons per hour at 10 psi as required by a catastrophic line leak test demanded by the Environmental Protection Agency (EPA). Monthly tests down to 0.2 gallons per hour may be conducted. Such monthly testing typically takes 1-5 hours. An annual test to the sensitivity of 0.1 gallons per hour may have been used to certify the system as "tight." The systems and methods described herein advantageously provide for more frequent and more sensitive testing.

In accordance with at least one embodiment of the present invention, line leak detectors sense whether pressure falls below a preset pressure, for instance twenty-two psi, fourteen psi, etc., as a determining factor to start a test, this understood by those of ordinary skill in the art. Once the pressure falls below the preset, the leak detector may initiate a line test. A line test method may comprise activating a pump, raising pressure in the dispensation line to thirty psi (or twenty-two psi, or other typical stable pressure on dispensation line) and stabilizing, and then sealing the system via the isolation valve and then monitoring the time of how long it might take for the pressure to drop to a second preset. In some embodiments, the method may include deactivating the pump once the pressure in the dispensation line reaches the stable pressure. Such monitoring and testing can be done continually. The test may further include reactivating the pump once the lower pressure threshold is reached and repeating the test. The system can thereby be tested via running pressure into the dispensation line multiple times and determining how long pressure drops take.

In order to initialize the system (e.g., upon install or setup), an installer will measure the amount of fluid to drop the pressure within line when removed to drop the pressure down to a set point such as fourteen psi (or above vapor pressure). The dispensation line will be pressurized (typically via pump), and then the installer mechanic will draw out fuel from the dispensation line to determine the amount of volume loss from a drop from typical dispensation line pressures down to the preset, such as fourteen psi. The preset is set above vapor pressure of contents of the line. A stabilized pressure for the system could be higher such as twenty-two psi so that the system can determine the pressure loss in a full fuel fluid line. In this manner, the system can know how much fuel, such as how many milliliters of fuel, will be reduced from the dispensation line to result in a drop between two set points. For instance, two set points can be twenty-two psi down to fourteen psi. In this way, one can give the time and volume of a leak rate. Thus, depending on ambient conditions, the system can differentiate between thermal drops and a leak. Repeated testing allows for determination of leaks, and necessarily an estimate of the volume loss over time. A leak will typically be shown by a constant drop in pressure, whereas a thermal change in pressure will fluctuate and modulate depending on fuel temperature vs ground temperature, etc.

Leaks may take some time to initialize from a first pressure setting to a second pressure setting. The time and volume of the leak may be noted. For instance, a catastrophic first threshold can be set at 3 gallons per hour (at 10 psi). A second pressure threshold up to a continuous leak test can run between 3 gallons per hour down to 2 gallons per hour, 1 gallon per hour, ½ gallon per hour, as well as 0.2 gallons per hour or lower and thereby calculate the leak rate.

Continuous testing of the line keeps or maintains dynamic pressure in the line. A method according to one embodiment includes turning on a pump at 14 psi to test line pressure drop. The pressure in line is preferably over the Reid vapor pressure to ensure a dynamic vapor pressure does not mess with the volume measurements of inline testing. If hydrocarbon vapor forms, the test may not be useful to determine a leak. Using line pressure isolation technology, real leaks that are in the pump head and therefore undetectable (upstream of the leak detection method) will no longer bleed the pressure out of the pump head and in some cases the line system, into the environment, a known method of pollution. Without line pressure isolation the pump or pump housing components introduce a manner that line pressure may drop, appearing as a leak into the environment even if it is only back into the tank. This type of false alarm is responsible for significant lost business as the station has to wait for a properly trained and certified technician to arrive to check the system and reestablish fueling. In addition the technician often must leave an already existing assignment for an emergency service call. The present invention includes a method to prevent formation of a vapor pocket in the line, and to ensure line pressure does not drop below the Reid vapor pressure, by isolating the pressure in the line. The present invention uses an electric line leak detector in conjunction with an isolation valve or as shown, mechanical line leak detector equipment to function as a line isolation valve in addition to their line leak detection function. The electronic line leak detector or mechanical line leak detector can use a pressure sensor.

With the electric line leak detector, leak detection rates can be more sensitive to provide more accuracy in a shorter time. Line leak detection can be provided even in high resilient lines. The window of resilience can be narrowed, such as narrowing a test between 22 psi to 14 psi to something more narrow such as a 22 psi to 18 psi and the window can be reduced to a narrow window from 20 to 10 minutes. By maintaining a narrow window, multiple tests can be performed and maintain repeatability of testing in a shorter period of time to maintain fast, low error in leak detection.

A leak detector node (LDN) can provide data in communication with an isolated line. The controller turns the pump on additional times and monitors the pressure in dispensation line. By monitoring the pressure on a continuous basis via a leak detector isolation valve, such as that described herein, a system can monitor changes in pressure in delivery lines at a threshold pressure of approximately 20 psi in line. This is a benefit over pump head detection as it is generally better to look at the pressure in the discharge side rather than including the pump with many known potential pressure loss points.

In the pump head and through the leak detector due to the geometry of the fuel flow high turbulence is created moving through and by the posts, basket webbing, pin, pin holder, corners, turns, etc. As a high volume is dispensed, the pressure in the leak detector becomes more differential and harder to read.

By isolating the dispensation line pressure, a direct linear pressure from the line against the bored fitting can provide better and more sensitive testing. The present invention includes a device to measure the pressure downstream of a pump isolated from pump head and line leak detection. The invention further includes a method for measuring between two various pressure set points when the pump is turned off through a specific window of two set pressures to provide a leak rate with time and volume noted to understand the leak rate of fuel leaving the line. The invention provides for repetitive testing by restarting pump to measure time between set points to therefore determine whether leaks are due to thermal expansion/contraction or an actual leak in the line.

The leak detector may have a smaller diameter piston area than the poppet to which it is attached. This smaller piston area keeps the leak detector in the fast fill position (e.g., three-GPM) to a higher line pressure while compressing vapor pockets and expanding flexible pipes faster. This means less time to full flow. Mechanical leak detectors consistent with the present disclosure do not have to completely reset (as opposed to leak detectors of the prior art) for the poppet to be forced into the reset mode at pump start-up. With a reduced piston size, as an example, there is one-fourth the fuel volume to replace when in leak search and one-fourth the fuel volume to return to the line to allow the MLD to reset when the pump turns off. This combination makes for a more responsive and faster leak detector. Less volume to leave the line for the leak detector to reset and catch leaks less volume to detect pressure drops, faster time to perform electronic line leak detection. Less volume to fill and provide full flow for dispensing.

By isolating the pump head check valve from the line, the present invention can reduce service calls for diagnostic for false alarms when the pump head is broken. Annual inspections for pump head check valves are inadequate for determining leaks (drain-back into the tank) The present invention will hopefully significantly reduce or even eliminate the need for service calls for pump head valve failures. The present invention is designed to increase the accuracy by not requiring a submersible check valve to function. By isolating the dispensation line, the test can be done with or without a functioning pump check valve. The material and design of the system with line pressures moving from narrow to wide to allow for the dispensation line to be self-cleaning as fuel flows through and will not otherwise affect the pressure sensed by the bored fastener.

The following examples pertain to further embodiments. The following examples of the present disclosure may comprise subject material such as an apparatus, a method, means for performing acts based on the method, and/or a system including a line pressure isolation valve.

According to example 1, there is provided a hydrocarbon fuel dispensation line pressure isolation valve. The hydrocarbon fuel dispensation line pressure isolation valve may comprise a narrow channel through a check valve, said narrow channel having a first lower opening to provide pressure communication with a dispensation line, and an upper opening to provide pressure communication with an upper chamber, and at least one pressure sensor coupled with the upper chamber, wherein said narrow channel is to provide pressure communication with a dispensation line pressure of the dispensation line through said narrow channel to enable the pressure sensor to test of the dispensation line pressure without removing the check valve.

Example 2 may include the elements of example 1, further comprising a shaft to provide pressure communication with the dispensation line through the hydrocarbon fuel dispensation line pressure isolation valve, wherein the narrow channel is disposed within the shaft.

Example 3 may include the elements of example 2, further comprising a fastener affixed at a lower end of said hydrocarbon fuel dispensation line pressure isolation valve, said fastener comprising a longitudinal aperture allowing pressure communication from the dispensation line to said shaft.

Example 4 may include the elements of any of examples 1 through 3, wherein said narrow channel is no greater than $1/8^{th}$ inch in diameter. In other embodiments, the narrow channel may be narrower than $1/16^{th}$ inch, or wider than $1/4^{th}$ inch.

Example 5 may include the elements of any of examples 1 through 4, further comprising a mechanical switch on a pressure sensor coupled with said upper chamber to communicate contact with the dispensation line pressure.

Example 6 may include the elements of any of examples 1 through 5, further comprising a pressure sensor coupled at a top of said line pressure isolation valve, said pressure sensor in pressure communication with said upper chamber.

According to example 7 there is provided a method of testing a dispensation line pressure on a hydrocarbon discharge system. The method may comprise the steps of a. initializing an amount of fluid required to draw in order to drop a pressure in an otherwise sealed dispensation line between two pressure levels, b. sensing a pressure on a dispensation line upstream of a vending nozzle, and c. measuring a time taken when pressure along the dispensation line drops between two predetermined thresholds.

Example 8 may include the elements of example 7, further comprising the step of repeating steps b and c after a further step of repressurizing the dispensation line via an upstream pump.

Example 9 may include the elements of example 8, further comprising the step of determining a profile of pressure as between the first measured time and the repeated measured time to find a volume loss over time.

Example 10 may include the elements of any of examples 7 through 9, wherein said step of measuring is completed via a pressure sensor attached to a line pressure isolation valve.

Example 11 may include the elements of any of examples 1 through 6, wherein said narrow channel is approximately 3/32' inch in diameter.

Example 12 may include the elements of any of examples 3 through 6 or 11, further comprising an alignment shaft in communication with said shaft to provide for pressure transfer from said dispensation line into said upper chamber.

Example 13 may include the elements of example 12, wherein said fastener comprises a hole bored screw, and said fastener is coupled to said alignment shaft.

Example 14 may include the elements of any of examples 3 through 6 or 11 through 12, wherein said fastener comprises a hole bored screw, and said fastener is coupled to a hollow stem of a basket of said check valve.

Example 15 may include the elements of any of examples 1 through 6 or 11 through 14, wherein said narrow channel passes through a metering pin.

Example 16 may include the elements of any of examples 1 through 6 or 11 through 15, wherein said narrow channel passes through a metering pin head.

Example 17 may include the elements of any of examples 1 through 6 or 11 through 16, wherein said narrow channel comprises an incompressible substance disposed therein.

Example 18 may include the elements of any of examples 1 through 6 or 11 through 17, wherein said narrow channel comprises water disposed therein.

Example 19 may include the elements of any of examples 1 through 6 or 11 through 18, wherein said channel comprises mercury disposed therein.

Example 20 may include the elements of any of examples 1 through 6 or 11 through 19, wherein said narrow channel passes through a piston.

I claim:

1. A method of initializing a dispensation line on a hydrocarbon discharge system, said method comprising the steps of:
    a. isolating the dispensation line from upstream components in a tank system via a line leak detector valve;
    b. lowering pressure in the dispensation line via drawing a set amount of fluid from the dispensation line;
    c. determining an amount of fluid loss required to drop the pressure in the dispensation line between a first predetermined pressure threshold and a lower second predetermined pressure threshold.

2. The method of claim 1, further comprising the step of:
    d. sensing the pressure in the dispensation line upstream of a vending nozzle at a line leak detector while maintaining isolation downstream of a head.

3. The method of claim 2, further comprising the step of calculating a leak rate after said step of determining, said step of calculating comprising the steps of:
    e. bleeding the dispensation line;
    f. detecting the fluid volume required to drop the pressure in the dispensation line from the first to the second predetermined pressure thresholds; and
    g. counting an amount of time for the dispensation line pressure to drop between the first and the second predetermined pressure thresholds.

4. The method of claim 3, compensating for at least one of the variables of ambient temperature, thermal expansion, coefficients of expansion, time, and barometric pressure.

5. The method of claim 3, wherein said steps e and f are conducted while the pressure in the upstream components is isolated from the dispensation line.

6. The method of claim 2, wherein said step d is conducted through a narrow channel through the line leak detector valve.

7. The method of claim 6, wherein said step d is conducted through a fastener in the line leak detector valve.

8. The method of claim 6, wherein said step d is conducted through a metering head pin in the line leak detector valve.

9. The method of claim 1, further comprising the step of detecting a downstream pressure through the line leak detector valve.

10. The method of claim 1, further comprising the step of flushing the dispensation line to create a solid liquid fill prior to said step of isolating.

11. The method of claim 1, wherein said lower second predetermined threshold is above the Reid vapor pressure of fluid in the dispensation line.

12. A method of testing a dispensation line pressure on a hydrocarbon discharge system, said method comprising the steps of:
    a. isolating the dispensation line from the upstream components in a tank system;
    b. initializing an amount of fluid loss required to drop a pressure in the dispensation line between two pressure levels;
    c. sensing the pressure on the dispensation line upstream of a vending nozzle; and
    d. measuring a first measured time taken when pressure along the dispensation line drops between the two pressure levels.

13. The method of claim 12, further comprising the step of repeating steps c and d, to determine a second measured time, after a further step of repressurizing the dispensation line via an upstream pump while a check valve at a downstream end of the dispensation line is closed.

14. The method of claim 13, further comprising the step of determining a time-based profile of pressure in the dispensation line as between the first measured time and the second measured time to find a volume loss over time.

15. The method of claim 14, wherein said step of measuring is completed via a pressure sensor attached to a line pressure isolation valve.

16. The method of claim 15, wherein said line pressure isolation valve is set downstream a head check valve, and said line pressure isolation valve remains closed after said steps a and during said steps b-d.

17. The method of claim 12, wherein said step of measuring is completed via a pressure sensor attached to a line pressure isolation valve.

18. The method of claim 12, wherein said step a is conducted by a line leak detector valve, and step c is conducted through the line leak detector valve.

19. The method of claim 18, wherein said step c is conducted through a narrow channel through the line leak detector valve.

20. The method of claim 18, wherein said step d is conducted through a metering head pin in the line leak detector valve.

* * * * *